(12) United States Patent
Sakakibara et al.

(10) Patent No.: US 12,054,640 B2
(45) Date of Patent: Aug. 6, 2024

(54) PROTECTIVE COMPOSITION

(71) Applicant: GOO CHEMICAL CO., LTD., Kyoto (JP)

(72) Inventors: Teru Sakakibara, Kyoto (JP); Shinya Komabiki, Kyoto (JP); Koji Maeda, Kyoto (JP)

(73) Assignee: GOO CHEMICAL CO., LTD., Kyoto (JP)

( * ) Notice: Subject to any disclaimer, the term of this patent is extended or adjusted under 35 U.S.C. 154(b) by 681 days.

(21) Appl. No.: 17/283,549

(22) PCT Filed: Mar. 9, 2020

(86) PCT No.: PCT/JP2020/009974
§ 371 (c)(1),
(2) Date: Apr. 8, 2021

(87) PCT Pub. No.: WO2021/181449
PCT Pub. Date: Sep. 16, 2021

(65) Prior Publication Data
US 2022/0145094 A1   May 12, 2022

(51) Int. Cl.
*C09D 5/08* (2006.01)
*C08G 63/183* (2006.01)
*C08G 63/189* (2006.01)
*C08G 63/199* (2006.01)
*C08G 63/672* (2006.01)
*C09D 167/02* (2006.01)

(52) U.S. Cl.
CPC .......... *C09D 5/08* (2013.01); *C08G 63/183* (2013.01); *C08G 63/189* (2013.01); *C08G 63/199* (2013.01); *C08G 63/672* (2013.01); *C09D 167/02* (2013.01)

(58) Field of Classification Search
CPC ...... C09D 5/08; C09D 167/02; C08G 63/183; C08G 63/199; C08G 63/672; C08G 63/189

USPC ........................................................ 524/605
See application file for complete search history.

(56) References Cited

U.S. PATENT DOCUMENTS

| | | | |
|---|---|---|---|
| 2005/0261461 A1* | 11/2005 | Maeda | D06M 13/282 528/272 |
| 2011/0257273 A1 | 10/2011 | Yabuuchi et al. | |
| 2020/0376877 A1 | 12/2020 | Shirokane et al. | |

FOREIGN PATENT DOCUMENTS

| | | | |
|---|---|---|---|
| CN | 102234369 A | 11/2011 | |
| JP | S555938 A | 1/1980 | |
| JP | H5230198 A | 9/1993 | |
| JP | H81368 A | 1/1996 | |
| JP | 2001131471 A | 5/2001 | |
| JP | 200389060 A | 3/2003 | |
| JP | 200467910 A | 3/2004 | |
| JP | 2009275186 A * | 11/2009 | |
| JP | 2009275186 A | 11/2009 | |
| JP | 2009275187 A | 11/2009 | |
| JP | 2013245255 A | 12/2013 | |
| JP | 2013247177 A | 12/2013 | |
| JP | 2019191470 A | 10/2019 | |
| WO | 2016042683 A1 | 3/2016 | |
| WO | 2019045944 A1 | 3/2019 | |
| WO | WO-2019045944 A1 * | 3/2019 | ......... B65D 17/4012 |
| WO | 2019188852 A1 | 10/2019 | |

OTHER PUBLICATIONS

Office Action in CN Application No. 202080005560.X, dated Jan. 11, 2022. 22pp.
Office Action in TW application No. 110107816, dated Sep. 2, 2021. 6 pp.
International Search Report in PCT/JP2020/009974, mailed Jun. 9, 2020. 7pp.

* cited by examiner

*Primary Examiner* — Hui H Chin
(74) *Attorney, Agent, or Firm* — HAUPTMAN HAM, LLP

(57) ABSTRACT

A protective composition is used to form a protective coating on a metal and contains a water-soluble polyester resin.

11 Claims, No Drawings

PROTECTIVE COMPOSITION

RELATED APPLICATIONS

The present application is a National Phase of International Application Number PCT/JP2020/009974, filed on Mar. 9, 2020.

TECHNICAL FIELD

The present disclosure generally relates to a protective composition and more particularly relates to a protective composition for use to protect a metal.

BACKGROUND ART

When subjected to physical or chemical surface treatment or mechanical machining, a metal is sometimes covered with a protective coating to protect a portion, not intended to be treated or machined, of the metal from gases, scatters, contaminants, and other substances involved with the treatment or machining (see, for example, Patent Literatures 1-3).

Such a protective coating is required to not only contact with the metal close enough to avoid coming off the metal during the treatment or machining but also be removable easily after the treatment or machining.

CITATION LIST

Patent Literature

Patent Literature 1: JP H08-1368 A
Patent Literature 2: JP 2003-89060 A
Patent Literature 3: JP 2019-191470 A

SUMMARY OF INVENTION

The problem to be overcome by the present disclosure is to provide a protective composition which is used to form, on a metal, a protective coating that contacts with the metal close enough and that is easily removable from the metal.

A protective composition according to an aspect of the present disclosure is used to form a protective coating on a metal and contains a water-soluble polyester resin (A).

DESCRIPTION OF EMBODIMENTS

An exemplary embodiment of the present disclosure will now be described.

A protective composition according to an embodiment is used to form a protective coating on a metal and contains a water-soluble polyester resin (A).

This may allow a protective coating made of the protective composition to contact with a metal sufficiently closely and may also allow the protective coating to be removed easily from the metal by bringing the protective coating into contact with an aqueous cleaning fluid.

Since the protective coating is removable with an aqueous cleaning fluid, the chances of causing deterioration in working environment during the removal of the protective coating may be reduced so significantly that the need to dispose of waste liquid may also be reduced significantly or even eliminated.

The type of the metal on which the protective coating is provided is not limited to any particular one. The metal may also be a semimetal. Examples of the metal include copper, aluminum, chromium, nickel, iron, silver, gold, gallium, indium, tantalum, boron, silicon, germanium, arsenic, and antimony, and alloys including at least one of these metals.

The metal may be a metallic substrate, or a metallic layer provided on a non-metallic substrate such as a glass substrate, whichever is appropriate.

The protective coating may be formed on the metal for whatever purposes. For example, the protective coating may be formed to protect the surface of the metal during storage, transportation, division, cutting, polishing, or laser ablation of the metal. Alternatively, the protective coating may also be formed as a resist when the metal is subjected to wet etching, dry etching using a reactive gas, for example, sandblasting, or plating, to name just a few.

The protective coating may be formed by applying the protective composition onto the metal and then drying the applied composition as needed, for example. The protective composition may be applied by any method without limitation. For example, the protective composition may be applied by bar coating, dip coating, spray coating, or spin coating. If necessary, the protective composition may be applied by two or more types of coating methods in combination. To dry the applied film of the protective composition, the applied film may be heated at a temperature of 120° C. or more, for example. Optionally, the applied film may be dried under a reduced pressure. The thickness of the applied film may be set at any appropriate value without limitation.

The protective coating may be removed from the metal by bringing the protective coating into contact with an aqueous cleaning fluid, for example. The aqueous cleaning fluid may be either water or a mixed solvent including water and an organic solvent, whichever is appropriate. The organic solvent contains at least one solvent selected from the group consisting of methanol, ethanol, acetone, methyl ethyl ketone, acetonitrile, and dimethyl acetoamide. Note that these organic solvents are only examples and should not be construed as limiting. Optionally, the aqueous cleaning fluid may contain an additive as needed. Examples of the additives include acids, surfactants, and metal anticorrosive agents. When the protective coating is brought into contact with the aqueous cleaning fluid, the protective coating may be immersed in the aqueous cleaning fluid or the aqueous cleaning fluid may be sprayed onto the protective coating. Alternatively, the protective coating may also be brought into contact with the aqueous cleaning fluid by any other method.

The protective composition will be described in further detail.

As described above, the protective composition contains a water-soluble polyester resin (A).

It belongs to a technical commonplace to determine that the water-soluble polyester resin (A) should have water solubility. It is particularly suitable that the water-soluble polyester resin (A) is dissolvable in water even without using any dispersive agent such as a hydrophilic organic solvent or a surfactant. For example, the water-soluble polyester resin (A) is suitably dissolved entirely in water by mixing the water-soluble polyester resin (A) and water at 90° C. at a ratio by mass of one to four and stirring the mixture up at a sufficiently high velocity for 2 hours while maintaining the temperature of the solution thus obtained at 90° C.

The water-soluble polyester resin (A) may contain a polyvalent carboxylic acid residue (a). The water-soluble polyester resin (A) may contain a polyvalent alcohol residue (b). The water-soluble polyester resin (A) may contain both the polyvalent carboxylic acid residue (a) and the polyvalent alcohol residue (b).

The water-soluble polyester resin (A) is a polymeric product to be produced by bonding monomer components with ester bonds. If the water-soluble polyester resin (A) contains a polyvalent carboxylic acid residue (a), then the monomer components may contain a polyvalent carboxylic acid component, for example. This allows the water-soluble polyester resin (A) to have a polyvalent carboxylic acid residue (a) derived from the polyvalent carboxylic acid component. If the water-soluble polyester resin (A) contains a polyvalent alcohol residue (b), then the monomer components may contain a polyvalent alcohol component, for example. This allows the water-soluble polyester resin (A) to have a polyvalent alcohol residue (b) derived from the polyvalent alcohol component. Optionally, the monomer components may contain both the polyvalent carboxylic acid component and the polyvalent alcohol component.

The polyvalent carboxylic acid component includes at least one compound selected from the group consisting of polyvalent carboxylic acid, of which the valence is equal to or greater than two, and an ester-forming derivative of the polyvalent carboxylic acid. Examples of the ester-forming derivatives of the polyvalent carboxylic acid include derivatives of the polyvalent carboxylic acid such as anhydrides, esters, acid chlorides, and halides of the polyvalent carboxylic acid. The ester-forming derivative of the polyvalent carboxylic acid is a compound that forms an ester by reacting to a polyvalent alcohol component to be described below. The polyvalent carboxylic acid has two or more carboxy groups per molecule.

The polyvalent alcohol component includes at least one compound selected from the group consisting of a polyvalent alcohol, of which the valence is equal to or greater than two, and an ester-forming derivative of the polyvalent alcohol. Examples of the ester-forming derivatives of the polyvalent alcohol include derivatives of the polyvalent alcohol such as a diacetate compound corresponding to the polyvalent alcohol. The ester-forming derivative of the polyvalent alcohol is a compound that forms an ester by reacting to the polyvalent carboxylic acid component. The polyvalent alcohol has two or more hydroxy groups per molecule.

The monomer component may contain a compound including: a carboxy group or an ester-forming derivative group thereof such as hydroxy acid, an ester-forming derivative of hydroxy acid, and lactone; and a hydroxy group and an ester-forming derivative group thereof.

The polyvalent carboxylic acid residue (a) suitably has no reactive functional groups but the carboxy group and the ester-forming derivative group thereof. Likewise, the polyvalent alcohol residue (b) suitably has no reactive functional groups but the hydroxy group and the ester-forming derivative group thereof. As used herein, the reactive functional groups refer to, for example, ethylenic unsaturated bonds and reaction groups such as an amino group, an imino group, a hydrazino group, a nitro group, an epoxy group, a cyano group, and an azo group.

It is particularly suitable that neither the polyvalent carboxylic acid residue (a) nor the polyvalent alcohol residue (b) includes any reactive functional group. In those cases, the number of the reactive functional groups of the water-soluble polyester resin (A) will decrease or the water-soluble polyester resin (A) will have no reactivity. Then, even if a protective composition including the water-soluble polyester resin (A) is heated to be dried after having been applied onto the substrate, or even if the protective coating made of the protective composition is heated with contact frictional heat while being cut off with a blade rotating at high velocities, or even if the protective coating is heated by being irradiated with a laser beam during the laser ablation machining, the chances of causing a decline in the water solubility of the water-soluble polyester resin (A) may be reduced. Furthermore, if the water-soluble polyester resin (A) has no reactive functional groups, the water-soluble polyester resin (A) does not tend to cause metal discoloration. Thus, even if the metal is covered with the protective coating, the metal does not discolor easily. Note that the metal sulfonate group does not count among the reactive functional groups.

If the water-soluble polyester resin (A) includes a polyvalent carboxylic acid residue (a), then the polyvalent carboxylic acid residue (a) suitably includes a polyvalent carboxylic acid residue (a1) having a metal sulfonate group. The presence of the polyvalent carboxylic acid residue (a1) having the metal sulfonate group imparts good water solubility to the water-soluble polyester resin (A), and therefore, makes the protective coating easily removable with the aqueous cleaning fluid.

The polyvalent carboxylic acid residue (a1) having the metal sulfonate group includes at least one selected from the group consisting of: a residue of an alkali metal salt of 5-sulfoisophthalic acid; a residue of an alkali metal salt of 2-sulfoisophthalic acid; a residue of an alkali metal salt of 4-sulfoisophthalic acid; a residue of an alkali metal salt of sulfoterephthalic acid; and a residue of an alkali metal salt of 4-sulfonaphthalene-2,6-dicaboxylate. To impart good water solubility to the water-soluble polyester resin (A), the alkali metal is suitably sodium, potassium, or lithium. Particularly when the polyvalent carboxylic acid residue having the metal sulfonate group includes a residue of sodium 5-sulfoisophthalate (such as a residue of dimethyl sodium 5-sulfoisophthalate or a residue of sodium 5-sulfoisophthalate), a sodium sulfonate group will remain effectively in the water-soluble polyester resin (A), thus imparting good water solubility to the water-soluble polyester resin (A).

The proportion of the polyvalent carboxylic acid residue (a1) having the metal sulfonate group to the polyvalent carboxylic acid residue (a) is suitably equal to or greater than 7 mol %. This imparts good water solubility to the water-soluble polyester resin (A), makes the protective coating easily removable with an aqueous cleaning fluid, and also allows the protective coating to contact with the metal sufficiently closely. This proportion is more suitably equal to or greater than 10 mol %, and even more suitably equal to or greater than 15 mol %. Meanwhile, this proportion may be equal to or less than 80 mol %, for example, is more suitably equal to or less than 70 mol %, and even more suitably equal to or less than 60 mol %.

The proportion of the polyvalent carboxylic acid residue (a1) having the metal sulfonate group to the polyvalent carboxylic acid residue (a) suitably falls within the range from 7 mol % to less than 15 mol %. This may make the protective coating hardly removable with water at an ordinary temperature but easily removable with hot water. Thus, the protective composition may be used in applications that utilize such properties. For example, in blade dicing in which a substrate is cut off with a blade rotating at high velocities pressed against the substrate, brining the blade into contact with the substrate generates contact frictional heat. To decrease the contact frictional heat, after the cutting process has been carried out with water sprayed onto the blade and the substrate, the protective coating provided on the substrate is sometimes removed with hot water. In such an application, the protective coating should be hardly removable with water at an ordinary temperature but easily removable with hot water.

If the water-soluble polyester resin (A) includes the polyvalent carboxylic acid residue (a), then the polyvalent carboxylic acid residue (a) suitably includes a naphthalene dicarboxylic acid residue (a2). The presence of the naphthalene dicarboxylic acid residue (a2) allows the water-soluble polyester resin (A) and the protective coating to absorb light having a wavelength of around 355 nm more easily and also allows laser ablation machining using a YAG laser beam (third-harmonic generation), for example, to be done more efficiently even if the protective composition does not contain a laser beam absorbent. In addition, if the protective composition contains no laser beam absorbent, the stability of the protective composition may be increased and bleedout of a laser beam absorbent from the protective coating and other problems may be eliminated.

The proportion of the naphthalene dicarboxylic acid residue (a2) to the polyvalent carboxylic acid residue (a) is suitably equal to or greater than 20 mol %. This may allow the protective coating to absorb light having a wavelength of around 355 nm particularly easily. This proportion is more suitably equal to or greater than 30 mol %, and even more suitably equal to or greater than 35%. Meanwhile, this proportion may be equal to or less than 93 mol %, for example, is suitably equal to or less than 90 mol %, and more suitably equal to or less than 80 mol %.

If the water-soluble polyester resin (A) includes the polyvalent carboxylic acid residue (a), then the polyvalent carboxylic acid residue (a) suitably includes both the polyvalent carboxylic acid residue (a1) having the metal sulfonate group and the naphthalene dicarboxylic acid residue (a2). This makes the protective coating easily removable with the aqueous cleaning fluid and allows the protective coating to absorb light having a wavelength of around 355 nm particularly easily.

Optionally, the polyvalent carboxylic acid residue (a) may further contain another polyvalent carboxylic acid residue (a3) in addition to the polyvalent carboxylic acid residue (a1) having the metal sulfonate group and the naphthalene dicarboxylic acid residue (a2).

The polyvalent carboxylic acid residue (a3) contains a dicarboxylic acid residue such as an aromatic dicarboxylic acid residue and an aliphatic dicarboxylic acid residue. Among other things, the polyvalent carboxylic acid residue suitably contains at least one selected from the group consisting of: residues of aromatic dicarboxylic acids such as a terephthalic acid residue and an isophthalic acid residue; and residues of aliphatic dicarboxylic acids such as a succinic acid residue, an adipic acid residue, a sebacic acid residue, a dodecane diacid residue, and 1,4-cyclohexane dicarboxylic acid residue. This allows the water-soluble polyester resin (A) to have good durability. Particularly when the polyvalent carboxylic acid residue (a3) contains an aliphatic dicarboxylic acid residue, the glass transition temperature of the water-soluble polyester resin (A) may be decreased easily. The naphthalene dicarboxylic acid residue (a2) tends to increase the glass transition temperature of the water-soluble polyester resin (A). However, if the water-soluble polyester resin (A) further contains a residue of an aliphatic dicarboxylic acid, that reduces the chances of the water-soluble polyester resin (A) having an excessively high glass transition temperature.

If the water-soluble polyester resin (A) includes the polyvalent alcohol residue (b), then the polyvalent alcohol residue (b) suitably includes a glycol residue. The glycol residue suitably includes at least one glycol residue selected from the group consisting of: an ethylene glycol residue, a diethylene glycol residue, a polyethylene glycol residue, a residue of a butanediol such as 1,4-butanediol residue, a residue of a hexanediol such as a 1,6-hexanediol residue, and a neopentyl glycol residue. This may allow the protective coating to contact with the metal particularly closely. In addition, this allows the water-soluble polyester resin (A) to have good durability and may decrease the glass transition temperature of the water-soluble polyester resin (A) easily. The residues included in the polyvalent alcohol residue are not limited to these but may further include a residue of 1,4-cyclohexanedimethanol, a bisphenol A residue, a bisphenol fluorene residue, and bisphenoxy ethanol fluorene residue, for example.

Among other things, the polyvalent alcohol residue (b) suitably includes an ethylene glycol residue (b1). The proportion of the ethylene glycol residue (b1) to the polyvalent alcohol residue (b) is suitably equal to or greater than 70 mol %. This may allow the protective coating to contact with the metal particularly closely. The proportion of the ethylene glycol residue (b1) is more suitably equal to or greater than 75 mol % and even more suitably equal to or greater than 80 mol %.

The polyvalent alcohol residue (b) suitably includes a polyethylene glycol residue as well. This may allow the protective coating to contact with the metal particularly closely. In addition, this allows the water-soluble polyester resin (A) to have good durability and may decrease the glass transition temperature of the water-soluble polyester resin (A) easily.

The number average molecular weight of the polyethylene glycol corresponding to the polyethylene glycol residue suitably falls within the range from 150 to 20000. This may allow the protective coating to contact with the metal particularly closely. This number average molecular weight more suitably falls within the range from 150 to 10000, and even more suitably falls within the range from 150 to 5000. Note that the number average molecular weight is derived based on the results of measurements of a hydroxyl value by acetic anhydride-pyridine method.

The proportion of the polyethylene glycol residue to the polyvalent alcohol residue (b) suitably falls within the range from 0.1 mol % to 30 mol %. This may allow the protective coating to contact with the metal particularly closely. This proportion more suitably falls within the range from 0.5 mol % to 25 mol % and even more suitably falls within the range from 1 mol % to 20 mol %.

If the water-soluble polyester resin (A) is synthesized out of monomer components including a polyvalent carboxylic acid component and a polyvalent alcohol component, then the proportions of the polyvalent carboxylic acid component and the polyvalent alcohol component are suitably adjusted such that the molar ratio of the total number of carboxy groups and ester-forming derivative groups thereof included in the polyvalent carboxylic acid component to the total number of hydroxy groups and ester-forming derivative groups thereof included in the polyvalent alcohol component falls within the range from 1:1.1 to 1:2.5.

The water-soluble polyester resin (A) may be produced by polymerizing the polyvalent carboxylic acid component and the polyvalent alcohol component together by a known method of making a polyester.

If the polyvalent carboxylic acid component is polyvalent carboxylic acid and the polyvalent alcohol component is polyvalent alcohol, then a direct esterification reaction of producing a reaction between the polyvalent carboxylic acid and the polyvalent alcohol in a single stage may be adopted, for example.

If the polyvalent carboxylic acid component is an ester-forming derivative of polyvalent carboxylic acid and the polyvalent alcohol component is polyvalent alcohol, then the water-soluble polyester resin (A) may be produced through a first-stage reaction which is a transesterification reaction between the ester-forming derivative of polyvalent carboxylic acid and polyvalent alcohol and a second-stage reaction in which a reaction product of the first-stage reaction causes polycondensation.

A method for producing a water-soluble polyester resin (A) through the first-stage reaction and the second-stage reaction will be described more specifically. In the transesterification reaction as the first-stage reaction, every material used for producing the water-soluble polyester resin (A) may be contained from the beginning in the reaction system. The transesterification reaction may be advanced by, for example, gradually heating, and increasing the temperature of, diester dicarboxylate and polyvalent alcohol to a temperature falling within the range from 150° C. to 260° C. under an ordinary pressure within an inert gas atmosphere such as nitrogen gas while holding the diester dicarboxylate and polyvalent alcohol in a reaction vessel.

The polycondensation reaction as the second-stage reaction may be advanced under a reduced pressure of 6.7 hPa (=5 mmHg) or less and at a temperature falling within the range from 160° C. to 280° C., for example.

At an arbitrary point in time during the first-stage reaction and the second-stage reaction, titanium, antimony, lead, zinc, magnesium, calcium, manganese, an alkali metal compound, or any other suitable substance may be added as a catalyst to the reaction system.

The number average molecular weight of the water-soluble polyester resin (A) suitably falls within the range from 1000 to 50000. If the number average molecular weight is equal to or greater than 1000, then the protective coating tends to have sufficient strength. If the number average molecular weight is equal to or less than 50000, then the water solubility of the water-soluble polyester resin (A) increases so much as to cause an effective increase in the water solubility of the protective coating. The number average molecular weight of the water-soluble polyester resin (A) more suitably falls within the range from 2000 to 40000. Note that the number average molecular weight of the water-soluble polyester resin (A) may be derived based on the result of measurement by gel permeation chromatograph (by being polystyrene converted).

The degree of water solubility of the water-soluble polyester resin (A) may be adjusted by, for example, striking an adequate balance between the molecular weight of the water-soluble polyester resin (A) and the proportion of the polyvalent carboxylic acid residue (a1) having the metal sulfonate group to the water-soluble polyester resin (A). In other words, the molecular weight of the water-soluble polyester resin (A) and the proportion of the polyvalent carboxylic acid residue (a1) having the metal sulfonate group are suitably set appropriately to allow the water-soluble polyester resin (A) to have sufficiently high water solubility.

Also, the water-soluble polyester resin (A) suitably has an acid number of 10 mgKOH/g or less. If the acid number thereof is 10 mgKOH/g or less, the water-soluble polyester resin (A) does not tend to discolor the metal.

The water-soluble polyester resin (A) suitably has a glass transition temperature of 10° C. to 100° C. If the glass transition temperature is equal to or higher than 10° C., the protective coating will not become excessively adhesive, thus often making it easier to handle the protective coating. If the glass transition temperature is equal to or lower than 100° C., it is much easier to form a coating of the protective composition, thus often achieving a sufficient degree of close contact between the protective coating and the metal. The glass transition temperature more suitably falls within the range from 20° C. to 80° C. and even more suitably falls within the range from 30° C. to 70° C. Note that the glass transition temperature may be derived based on the results of differential scanning calorimetry.

The proportion of the water-soluble polyester resin (A) in the protective composition suitably falls within the range from 1% by mass to 100% by mass, more suitably falls within the range from 10% by mass to 90% by mass, and even more suitably falls within the range from 15% by mass to 80% by mass, with respect to the solid content (nonvolatile components) of the protective composition.

The protective composition may further contain an additional aqueous resin other than the water-soluble polyester resin (A). The presence of the additional aqueous resin may increase the degree of applicability of the protective composition by adjusting the viscosity of the protective composition, for example. The aqueous resin contains at least one material selected from the group consisting of polyvinyl alcohol, polyurethane, an acrylic resin, a cellulose derivative, modified polypropylene, and modified polyethylene, for example.

The protective composition may contain an appropriate additive. The additive contains at least one agent selected from the group consisting of a leveling agent, an antioxidant, an ultraviolet absorbent and a defoamer, for example.

The protective composition may contain at least one of water or a hydrophilic organic solvent. This allows the degree of applicability of the protective composition to be increased by adjusting the viscosity of the protective composition, for example. The hydrophilic organic solvent contains at least one selected from the group consisting of: alcohols such as methanol, ethanol, 2-propanol, and 1,2-propanediol; glycol ethers such as propylene glycol monomethyl ether, ethyl cellosolve, and n-butyl cellosolve; and ketones such as acetone, methyl ethyl ketone, and cyclohexanone.

The protective composition according to this embodiment may be applied easily by bar coating, dip coating, spray coating or spin coating, in particular.

EXAMPLES

Specific examples of this embodiment will now be described. Note that the following are only examples of the present disclosure and should not be construed as limiting.

1. Preparation of Polyester Resin

A reaction vessel having a capacity of 1000 ml and including a stirrer, a nitrogen gas inlet port, a thermometer, a rectifying tower, and a cooling condenser was provided. Into this reaction vessel, the materials shown in the following Tables 1 and 2 and titanium potassium oxalate as a catalyst were introduced to obtain a mixture. This mixture had its temperature raised to 200° C. while being stirred up and mixed under an ordinary pressure and in a nitrogen atmosphere and then had its temperature gradually raised to 250° C. in 4 hours, thereby completing a transesterification reaction. Next, this mixture had its pressure gradually reduced to 0.67 hPa (=0.5 mmHg) at a temperature of 250° C. and was maintained in that state for 2 hours to advance a polycondensation reaction. In this manner, a polyester resin was obtained.

2. Preparation of Composition (1) Examples 1-14

50 parts by mass of this polyester resin and 200 parts by mass of water were mixed together and then the mixture was maintained at a temperature of 90° C. for 2 hours while being stirred up, thereby obtaining a polyester resin solution with a polyester resin concentration of 20% by mass.

(2) Comparative Examples 1-4

A polyester resin representing each of the first to fourth comparative examples had too low water solubility to dissolve under the condition for the first to fourteenth examples. Thus, the resin was dissolved using n-butyl cellosolve as a hydrophilic organic solvent. Specifically, 50 parts by mass of the polyester resin, 25 parts by mass of n-butyl cellosolve, and 175 parts by mass of water were mixed together and then the mixture was maintained at a temperature of 90° C. for 2 hours while being stirred up, thereby obtaining a polyester resin solution with a polyester resin concentration of 20% by mass.

3. Evaluation of Physical Properties (1) Number Average Molecular Weight

The number average molecular weight of the polyester resin in the composition was derived based on the results of measurement using a gel permeation chromatograph (by being polystyrene converted).

(2) Glass Transition Temperature

The glass transition temperature of the polyester resin in the composition was derived based on the results of measurement of differential scanning calorimetry.

(3) Acid Number

The acid number of the polyester resin in the composition was measured by titration using an ethanol solution of potassium hydroxide.

4. Evaluation Methods (1) Degree of Close Contact with Substrate

A copper plate, an aluminum plate, a stainless steel (SUS304) plate, and a single-crystal silicon wafer were provided as substrates. The composition was applied with a bar coater onto each of these substrates and was dried by being heated at 100° C. for 10 minutes. In this manner, a protective coating with a thickness of 5 μm was formed on each substrate. Subsequently, a piece of cellophane adhesive tape was brought into close contact with the protective coating on the substrate and then peeled off to observe the appearance of the protective coating left on the substrate. The conditions of the protective coating were rated as follows based on the results:

Grade A: when peeling was recognized nowhere on the protective coating;
Grade B: when peeling was recognized here and there on the protective coating; and
Grade C: when peeling was recognized almost everywhere on the protective coating.

(2) Blade Machinability

An aluminum plate was provided as a substrate. A protective coating with a thickness of 5 μm was formed on the substrate in the same way as in "(1) Degree of close contact with substrate." Next, grooves with a width of about 80 μm were formed on the protective coating with a carbide metallic blade rotating at high velocities. Subsequently, the appearance of the substrate was observed through a microscope and the blade machinability was rated as follows based on the results:

Grade A: when the coating could be machined into a desired shape with cracks or peeling recognized nowhere on the protective coating;
Grade B: when the coating could be machined into the desired shape with cracks and peeling recognized here and there on the protective coating; and
Grade C: when the coating could not be machined into the desired shape with cracks and peeling recognized almost everywhere on the protective coating.

Note that when the samples were brought into contact with water running at a flow rate of 1.94 L/min and having a water temperature of 70° C. for 5 minutes after the evaluations, no protective coating was left on the substrate and no discoloration or any other abnormality was seen on the protected substrate in any of the samples.

(3) Evaluation of Absorbance of Light with a Wavelength of 355 nm

The composition was diluted with water and the absorption spectrum of the resin solution thus obtained was measured with an ultraviolet and visible spectrophotometer. The absorbance of the composition was rated as follows based on the results:

Grade A: when absorption of light with a wavelength of 355 nm into the composition was recognized; and
Grade B: when no absorption of light with a wavelength of 355 nm into the composition was recognized.

(4) Laser Patternability

The composition was applied by spin coating onto a single-crystal silicon substrate and then dried naturally to form a protective coating with a thickness of 10 μm. The protective coating was subjected to laser ablation in which the protective coating was irradiated with a UV laser beam (with a wavelength of 355 nm) using a Q switch laser diode to form grooves with a width of about 20 μm. The laser patternability of the protective coating was rated as follows based on the results.

Grade A: when the coating could be patterned into a desired shape with peeling recognized nowhere between the protective coating and the substrate;
Grade B: when the coating could be patterned into the desired shape with peeling recognized here and there between the protective coating and the substrate; and
Grade C: when the coating could not be patterned into the desired shape with peeling recognized between the protective coating and the substrate.

Note that when the samples were brought into contact with water running at a flow rate of 1.94 L/min and having a water temperature of 70° C. for 5 minutes after the evaluations, no protective coating was left on the substrate in any of the samples. In addition, no discoloration or any other abnormality was seen on a protected part of the substrate in any of the samples rated as Grade A or B.

(5) Removability #1

A stainless steel (SUS304) plate was provided as a substrate and a protective coating with a thickness of 5 μm was formed on the substrate in the same way as in "(1) Degree of close contact with substrate" described above. Then, the protective coating was brought into contact with water running at a flow rate of 1.94 L/min and having a water temperature of 30° C. for 5 minutes. Subsequently, the appearance of the substrate was observed to rate the removability of the protective coating as follows based on the results. A test was carried out in the same way with the water temperature of the running water changed into 70° C. to rate the removability of the protective coating in the same way:
 Grade A: when no protective coating residue was recognized on the substrate;
 Grade B: when protective coating residues were recognized here and there on the substrate; and
 Grade C: when protective coating residues were recognized almost everywhere on the substrate.

Note that in any of these cases, no discoloration or any other abnormality was seen in the protected part of the substrate.

(6) Removability #2

An aluminum plate was provided as a substrate and a protective coating with a thickness of 5 μm was formed on the substrate in the same way as in "(1) Degree of close contact with substrate" described above. Next, grooves with a width of about 80 μm were formed on the protective coating with a carbide metallic blade rotating at high velocities. Thereafter, the protective coating was brought into contact with water running at a flow rate of 1.94 L/min and having a water temperature of 30° C. for 5 minutes. Subsequently, the appearance of the substrate was observed through a microscope to rate the removability of the protective coating as follows based on the results. A test was carried out in the same way with the water temperature of the running water changed into 70° C. to rate the removability of the protective coating in the same way:
 Grade A: when no protective coating residue was recognized on the substrate;
 Grade B: when protective coating residues were recognized here and there on the substrate; and
 Grade C: when protective coating residues were recognized almost everywhere on the substrate.

Note that in any of these cases, no discoloration or any other abnormality was seen in the protected part of the substrate.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Materials | Polyvalent carboxylic acid component/parts by mass (parts by mole) | Dimethyl sodium 5-sulfoisophthalate | 20.7 (0.07) | 29.6 (0.10) | 44.4 (0.15) | 59.2 (0.20) | 88.9 (0.30) | 118.5 (0.40) | 148.1 (0.50) | 207.4 (0.70) | 177.7 (0.60) |
| | | Dimethyl 2,6-naphthalene dicarboxylate | | | | | | | | | 48.8 (0.20) |
| | | Dimethyl terephthalate | 180.6 (0.93) | 97.1 (0.50) | 97.1 (0.50) | 97.1 (0.50) | 97.1 (0.50) | 97.1 (0.50) | 38.8 (0.20) | 58.3 (0.30) | 38.8 (0.20) |
| | | Dimethyl isophthalate | | | 77.7 (0.40) | 68.0 (0.35) | 58.3 (0.30) | | | | |
| | | Sebacic acid | | | | | | | 20.2 (0.10) | 60.7 (0.30) | |
| | | 1,4-cyclohexane dicarboxylate | | | | | | 34.4 (0.20) | | | |
| | Polyvalent alcohol component/parts by mass (parts by mole) | Ethylene glycol | 99.3 (1.60) | 93.1 (1.50) | 124.1 (2.00) | 111.7 (1.80) | 99.3 (1.60) | 111.7 (1.80) | 86.9 (1.40) | 111.7 (1.80) | 105.5 (1.70) |
| | | Diethylene glycol | | | 53.1 (0.50) | | | | | | |
| | | 1,6-hexanediol | | | | 23.6 (0.20) | | | | 23.6 (0.20) | |
| | | 1,4-butanediol | | | | | 36.0 (0.40) | | 54.1 (0.60) | | 27.0 (0.30) |
| | | Polyethylene glycol (Mn: 200) | 80.0 (0.40) | | | | | | | | |
| | | Polyethylene glycol (Mn: 400) | | | | | | | | | |
| | | Neopentyl glycol | | | | | | | 20.8 (0.20) | | |
| Physical properties | Number average molecular weight | | 10340 | 9930 | 9780 | 10200 | 9860 | 8230 | 7880 | 5930 | 6250 |
| | Glass transition temperature (° C.) | | 39 | 43 | 51 | 44 | 33 | 45 | 15 | 46 | 57 |
| | Acid number (mgKOH/g) | | 2 | 3 | 2 | 3 | 4 | 5 | 4 | 6 | 6 |
| Evaluation | Degree of close contact with substrate | Copper plate | A | A | A | A | A | A | A | A | A |
| | | Aluminum plate | A | A | A | A | A | A | A | A | A |
| | | Stainless steel plate (SUS 304) | A | A | A | A | A | A | A | A | A |
| | | Single crystal silicon wafer | A | A | B | A | A | A | A | A | A |

TABLE 1-continued

|  |  | Examples | | | | | | | | |
|---|---|---|---|---|---|---|---|---|---|---|
|  |  | 1 | 2 | 3 | 4 | 5 | 6 | 7 | 8 | 9 |
|  | Blade machinability | A | A | A | A | A | A | B | A | A |
|  | Absorbance of light with wavelength of 355 nm | B | B | B | B | B | B | B | B | A |
|  | Laser patternability | C | C | C | C | C | C | C | C | B |
| Removability #1 | Water temperature of 30° C. | C | C | B | A | A | A | A | A | A |
|  | Water temperature of 70° C. | A | A | A | A | A | A | A | A | A |
| Removability #2 | Water temperature of 30° C. | C | C | B | A | A | A | A | A | A |
|  | Water temperature of 70° C. | A | A | A | A | A | A | A | A | A |

TABLE 2

|  |  |  | Example | | | | | Comparative examples | | | |
|---|---|---|---|---|---|---|---|---|---|---|---|
|  |  |  | 10 | 11 | 12 | 13 | 14 | 1 | 2 | 3 | 4 |
| Materials | Polyvalent carboxylic acid component/parts by mass (parts by mole) | Dimethyl sodium 5-sulfoisophthalate | 118.5 (0.40) | 88.9 (0.30) | 88.9 (0.30) | 59.2 (0.20) | 44.4 (0.15) | 14.8 (0.05) | 14.8 (0.05) | 17.8 (0.06) | 17.8 (0.06) |
|  |  | Dimethyl 2,6-naphthalene dicarboxylate | 85.5 (0.35) | 85.5 (0.35) | 122.1 (0.50) | 134.3 (0.55) | 158.8 (0.65) |  |  | 219.8 (0.90) | 229.6 (0.94) |
|  |  | Dimethyl terephthalate | 48.5 (0.25) | 48.5 (0.25) |  |  |  | 184.5 (0.95) | 87.74 (0.45) |  |  |
|  |  | Dimethyl isophthalate |  |  |  |  |  |  | 38.8 (0.20) |  |  |
|  |  | Sebacic acid |  |  | 40.5 (0.20) | 50.6 (0.25) |  |  | 60.7 (0.30) | 8.1 (0.04) |  |
|  |  | 1,4-cyclohexane dicarboxylate |  | 17.2 (0.10) |  |  | 34.4 (0.20) |  |  |  |  |
|  | Polyvalent alcohol component/parts by mass (parts by mole) | Ethylene glycol | 99.3 (1.60) | 124.1 (2.00) | 99.3 (1.60) | 99.3 (1.60) | 99.3 (1.60) | 74.5 (1.20) | 86.9 (1.40) | 93.1 (1.50) | 124.1 (2.00) |
|  |  | Diethylene glycol |  |  | 42.4 (0.40) |  |  |  |  |  |  |
|  |  | 1,6-hexanediol |  |  |  |  |  |  |  | 59.1 (0.50) |  |
|  |  | 1,4-butanediol | 36.0 (0.40) |  |  |  |  |  | 54.1 (0.60) |  |  |
|  |  | Polyethylene glycol (Mn: 200) |  |  |  | 80.0 (0.40) |  |  |  |  |  |
|  |  | Polyethylene glycol (Mn: 400) |  |  |  |  | 160 (0.40) |  |  |  |  |
|  |  | Neopentyl glycol |  |  |  |  |  | 83.3 (0.80) |  |  |  |
| Physical properties | Number average molecular weight |  | 6820 | 8150 | 7650 | 8530 | 8320 | 10850 | 11200 | 10560 | 9640 |
|  | Glass transition temperature (° C.) |  | 62 | 72 | 58 | 34 | 52 | 56 | 12 | 68 | 122 |
|  | Acid number (mgKOH/g) |  | 6 | 5 | 5 | 4 | 3 | 2 | 2 | 2 | 3 |
| Evaluation | Degree of close contact with substrate | Copper plate | A | B | A | A | A | B | A | B | C |
|  |  | Aluminum plate | A | A | A | A | A | B | A | A | C |
|  |  | Stainless steel plate (SUS 304) | A | A | A | A | A | B | A | A | C |
|  |  | Single crystal silicon wafer | A | B | A | A | A | B | A | B | C |
|  | Blade machinability |  | A | B | A | A | A | B | B | B | C |
|  | Absorbance of light with wavelength of 355 nm |  | A | B | A | A | A | B | B | A | A |
|  | Laser patternability |  | A | B | A | A | A | C | C | B | C |
| Removability #1 | Water temperature of 30° C. |  | A | A | A | A | B | C | C | C | C |
|  | Water temperature of 70° C. |  | A | A | A | A | A | C | C | C | C |
| Removability #2 | Water temperature of 30° C. |  | A | A | A | A | B | C | C | C | C |
|  | Water temperature of 70° C. |  | A | A | A | A | A | C | C | C | C |

As can be seen from the foregoing description of an exemplary embodiment and examples, a protective composition according to a first aspect of the present disclosure is used to form a protective coating on a metal and contains a water-soluble polyester resin (A).

The first aspect may allow a protective coating made of the protective composition to contact with a metal closely enough and may also allow the protective coating to be removed easily by bringing the protective coating into contact with an aqueous cleaning fluid.

In a protective composition according to a second aspect of the present disclosure, which may be implemented in conjunction with the first aspect, the water-soluble polyester resin (A) includes a polyvalent carboxylic acid residue (a). The polyvalent carboxylic acid residue (a) includes a polyvalent carboxylic acid residue (a1) having a metal sulfonate group. The proportion of the polyvalent carboxylic acid residue (a1) having the metal sulfonate group to the polyvalent carboxylic acid residue (a) falls within the range from 7 mol % to 80 mol %.

The second aspect may allow the water-soluble polyester resin (A) to exhibit so good water solubility that the protective coating is removable with an aqueous cleaning fluid particularly easily.

In a protective composition according to a third aspect, which may be implemented in conjunction with the second aspect, the proportion of the polyvalent carboxylic acid residue (a1) having the metal sulfonate group to the polyvalent carboxylic acid residue (a) falls within the range from 7 mol % to less than 15 mol %.

The third aspect may make the protective coating hardly removable with water at an ordinary temperature but easily removable with hot water.

In a protective composition according to a fourth aspect, which may be implemented in conjunction with any one of the first to third aspects, the water-soluble polyester resin (A) includes a polyvalent carboxylic acid residue (a). The polyvalent carboxylic acid residue (a) includes a naphthalene dicarboxylic acid residue (a2). The proportion of the naphthalene dicarboxylic acid residue (a2) to the polyvalent carboxylic acid residue (a) falls within the range from 20 mol % to 93 mol %.

The fourth aspect may allow the water-soluble polyester resin (A) and the protective coating to absorb light having a wavelength of around 355 nm more easily and may also allow laser ablation machining using a YAG laser beam (third-harmonic generation), for example, to be done more efficiently even if the protective composition does not contain a laser beam absorbent.

In a protective composition according to a fifth aspect, which may be implemented in conjunction with any one of the first to fourth aspects, the water-soluble polyester resin (A) includes a polyvalent alcohol residue (b). The polyvalent alcohol residue (b) includes an ethylene glycol residue (b1). The proportion of the ethylene glycol residue (b1) to the polyvalent alcohol residue (b) is equal to or greater than 70 mol %.

The fifth aspect may allow the protective coating to contact with the metal particularly closely.

In a protective composition according to a sixth aspect, which may be implemented in conjunction with any one of the first to fifth aspects, the water-soluble polyester resin (A) has an acid number of 10 mgKOH/g or less.

The sixth aspect may significantly reduce the chances of the water-soluble polyester resin (A) causing metal discoloration.

In a protective composition according to a seventh aspect, which may be implemented in conjunction with any one of the first to sixth aspects, the water-soluble polyester resin (A) has a glass transition temperature of 10° C. to 100° C.

The seventh aspect may reduce the chances of the protective coating coming to have excessive adhesiveness and may make it much easier to form the protective coating to allow the protective coating to contact with the metal sufficiently closely.

The invention claimed is:

1. A protective composition for use to form a protective coating on a metal, the protective composition containing a water-soluble polyester resin (A),
   the water-soluble polyester resin (A) including a polyvalent carboxylic acid residue (a),
   the polyvalent carboxylic acid residue (a) including a naphthalene dicarboxylic acid residue (a2),
   a proportion of the naphthalene dicarboxylic acid residue (a2) to the polyvalent carboxylic acid residue (a) falling within a range from 20 mol % to 93 mol %.

2. The protective composition of claim 1, wherein
   the polyvalent carboxylic acid residue (a) includes a polyvalent carboxylic acid residue (a1) having a metal sulfonate group, and
   a proportion of the polyvalent carboxylic acid residue (a1) having the metal sulfonate group to the polyvalent carboxylic acid residue (a) falls within a range from 7 mol % to 80 mol %.

3. The protective composition of claim 2, wherein
   the proportion of the polyvalent carboxylic acid residue (a1) having the metal sulfonate group to the polyvalent carboxylic acid residue (a) falls within a range from 7 mol % to less than 15 mol %.

4. The protective composition of claim 1, wherein
   the water-soluble polyester resin (A) includes a polyvalent alcohol residue (b),
   the polyvalent alcohol residue (b) includes an ethylene glycol residue (b1), and
   a proportion of the ethylene glycol residue (b1) to the polyvalent alcohol residue (b) is equal to or greater than 70 mol %.

5. The protective composition of claim 1, wherein
   the water-soluble polyester resin (A) has an acid number of 10 mgKOH/g or less.

6. The protective composition of claim 1, wherein
   the water-soluble polyester resin (A) has a glass transition temperature of 10° C. to 100° C.

7. The protective composition of claim 2, wherein
   the water-soluble polyester resin (A) includes a polyvalent alcohol residue (b),
   the polyvalent alcohol residue (b) includes an ethylene glycol residue (b1), and
   a proportion of the ethylene glycol residue (b1) to the polyvalent alcohol residue (b) is equal to or greater than 70 mol %.

8. The protective composition of claim 3, wherein
   the water-soluble polyester resin (A) includes a polyvalent alcohol residue (b),
   the polyvalent alcohol residue (b) includes an ethylene glycol residue (b1), and
   a proportion of the ethylene glycol residue (b1) to the polyvalent alcohol residue (b) is equal to or greater than 70 mol %.

9. The protective composition of claim 2, wherein
   the water-soluble polyester resin (A) has an acid number of 10 mgKOH/g or less.

10. The protective composition of claim 3, wherein the water-soluble polyester resin (A) has an acid number of 10 mgKOH/g or less.

11. The protective composition of claim 4, wherein the water-soluble polyester resin (A) has an acid number of 10 mgKOH/g or less.

\* \* \* \* \*